United States Patent [19]

Kimura et al.

[11] Patent Number: 4,883,183

[45] Date of Patent: Nov. 28, 1989

[54] BILL DEPOSITING/DISPENSING APPARATUS

[75] Inventors: Haruo Kimura; Takeo Ishidate; Masao Goto, all of Tokyo, Japan

[73] Assignee: Oki Electric Industry Co., Ltd., Tokyo, Japan

[21] Appl. No.: 103,822

[22] Filed: Oct. 2, 1987

[30] Foreign Application Priority Data

Oct. 13, 1986 [JP] Japan ................................ 61-241464

[51] Int. Cl.[4] ........................ G06F 15/30; G07D 7/00

[52] U.S. Cl. .................................... 209/534; 194/206; 235/379; 271/3.1

[58] Field of Search ................ 209/534; 194/206, 207; 221/21; 235/379; 271/3.1

[56] References Cited

U.S. PATENT DOCUMENTS 4,398,088 8/1983 Hirose et al. .................... 209/534 X
4,510,380 4/1985 Uchida et al. ........................ 194/206
4,511,795 4/1985 Wood et al. ...................... 235/375 X
4,602,332 7/1986 Hirose et al. ........................ 194/206

FOREIGN PATENT DOCUMENTS 58-36475 9/1983 Japan .

*Primary Examiner*—F. J. Bartuska
*Attorney, Agent, or Firm*—Wenderoth, Lind & Ponack

[57] ABSTRACT

Re-dispensable bills, such as less skewed bills and successive bills, among these rejected bills which are normal but rendered undiscriminatable while being dispensed from the storage boxes to the clerk-side bill slot are temporarily stacked, in the customer-side bill slot, and the bills are stored from the customer-side bill slot into the storage boxes when desired bills stacked in the clerk-side bill slot are completely dispensed. Re-dispensably bills, such as less skewed bills and successive bills, among those rejected bills which are normal but rendered undiscriminatable while being dispensed from the storage boxes to the customer-side bill slot are temporarily stacked in the clerk-side bill slot, and the bills are stored from the clerk-side bill slot into the storage boxes when desired bills stacked in the customer-side bill slot are completely dispensed.

2 Claims, 5 Drawing Sheets

BILL DEPOSITING/DISPENSING APPARATUS

BACKGROUND OF THE INVENTION

The present invention relates to a bill depositing/dispensing apparatus for re-dispensing redispensable bills or paper money among rejected bills in a money dispensing procedure.

There have been proposed in the banking business bill depositing/dispensing apparatus having a bill slot through which customers can deposit and receive bills and another bill slot through which clerks can deposit and receive bills. Such bill depositing/dispensing apparatus allow customers to deposit and receive bills without involving manual intervention by clerks, so that manual labor and psychological burdens on the clerks can be reduced.

FIG. 4 of the accompanying drawings illustrates a conventional bill depositing/dispensing apparatus, generally designated by the reference number 1. The apparatus 1 has a customer-side bill insertion slot 2. Bills inserted through the insertion slot 2 by a customer are separated by a separator 3 and delivered through feed paths 4, 5 into a discriminator 6 in which the bills are checked one by one to ascertain whether they are true or false, normal or marred, their face or back is being detected, and for the bill denomination.

If discriminated bills are true and normal, then they are delivered through feed paths 9, 10 into temporary storage units 7, 8 where they are stacked. If bills are marred, they are stacked in a temporary storage unit 11. Those bills which cannot be discriminated for some reason are discharged via feed paths 9, 12, 13 into a customer access slot 14.

When the transaction or bill deposit is accepted by the customer, the bills stacked in the temporary storage units are stored in respective storage boxes 15, 16, 17 in response to a signal representative of the customer's acceptance.

Bills inserted through a clerk-side bill insertion slot 18 by a clerk are separated by a separator 19 and delivered through the feed paths 13, 5 into the discriminator 6 in which the bills are checked one by one to ascertain whether they are true or false, normal or marred, their face or back is being detected, and for the bill denomination. If discriminated bills are true and normal, then they are stacked in the temporary storage units 7, 8. If bills are marred, they are stacked in the temporary storage unit 11. Those bills which cannot be discriminated for some reason are discharged via feed paths 9, 20 into a clerk access slot 20. When the transaction or bill deposit is accepted by the clerk, the bills stacked in the temporary storage units are stored in respective storage boxes 15, 16, 17 in response to a signal representative of the clerk's acceptance.

In a money dispensing procedure, bottom plates 23, 24, 25 in the temporary storage units 7, 8 11 are moved in the direction of the arrow (a) to separate bills 26 one by one by respective stages 27, 28, 29 until the amount of money to be dispensed is reached and to feed them through feed paths 10, 30, 5 into the discriminator 6 in which they are checked for the bill denomination and to determine whether their face or back is being detected.

Where bills are to be dispensed to the customer, they are delivered through the feed paths 9, 12, 13 into the customer access slot 14. Any rejected bills which are normal but cannot be discriminated for the reason of some abnormal conditions such as a skewed bill, a succession of bills, an impaired bill, and the like, are sent through the feed path 9 into a reject box 22.

Where bills are to be dispensed to the clerk, they are delivered through the feed paths 9, 20 into the clerk access slot 21. Any rejected bills which are normal but cannot be discriminated for the reason of some abnormal conditions such as a skewed bill, a succession of bills, an impaired bill, and the like, are sent through the feed path 9 into the reject box 22.

FIG. 5 of the accompanying drawings shows a bill depositing/dispensing apparatus disclosed in Japanese Laid-Open Utility Model Publication No. 58-36475. The apparatus has bill storage boxes 31 through 34. The bill storage box 31 stores 10,000 yen bills, the bill storage box 32 stores 1,000 yen bills, the bill storage box 33 stores 5,000 yen bill, and the bill storage box 34 stores marred bills of respective denominations.

When dispensing bills, they are delivered out of the bill storage boxes 31 through 34 by delivery rollers 35 through 37, respectively, and fed via feed paths 38, 39 into a discriminator 40 which checks the bills to ascertain whether they are true or false, normal or marred, and for the bill denomination. If bills are true and normal, they are stacked, as bills to be dispensed, onto a receiver plate 42 by a director 41. If bills are marred, they are delivered through a feed path 43 and stacked in the bill storage box 34.

Any rejected bills which are normal but cannot be discriminated for the reason of some abnormal conditions such as a skewed bill, a succession of bills, an impaired bill, and the like, are directed by a director 44 to go through a return feed passage composed of feed paths 45, 46 into the discriminator 40 for re-discrimination.

The rejected bills can be discharged from the bottom of the bill storage box 34 by a delivery roller 37 and circulated again through feed paths 39, 46.

In the former conventional apparatus, any re-dispensable bills among the rejected bills stored in the reject box are not available for being dispensed. Since bills in the apparatus cannot be efficiently employed, therefore, dispensable bills have to be supplied frequently in unit time, resulting in a low degree of efficiency of transactions.

The latter conventional apparatus is capable of employing bills more efficiently as bills in the marred-bill storage box can be circulated again. However, because marred bills are also delivered from the marred-bill storage box to the discriminator, there is a greater possibility for a jam to happen in the feed paths. When a jam occurs, the efficiency of operation is lowered.

SUMMARY OF THE INVENTION

It is an object of the present invention to provide a bill depositing/dispensing apparatus capable of dispensing re-dispensable bills among rejected bills in a money dispensing procedure.

According to the present invention, there is provided a bill depositing/dispensing apparatus comprising: a customer-side bill slot for receiving and dispensing bills; a clerk-side bill slot for receiving and dispensing bills; a discriminator for ascertaining whether bills are true or false, normal or marred, their face or back is being detected, and for the bill denomination; temporary storage units for temporarily storing those bills which are true; storage boxes for storing the bills delivered from the temporary storage units; means for returning those bills which are false to the customer-side bill slot; separators for separating and delivering the bills from the storage boxes to the discriminator; means for storing undiscriminatable bills into a rejected-bill storage box; means for dispensing bills to the custome-side bill slot or the clerk-side bill slot; means for temporarily stacking, in the customer-side bill slot, re-dispensable bills among those rejected bills which are normal but rendered undiscriminatable while being dispensed from thee storage boxes to the clerk-side bill slot, and for storing the bills from the customer-side bill slot into the storage boxes when desired bills stacked in the clerk-side bill slot are completely dispensed; and means for temporarilty stacking, in the clerk-side bill slot, re-dispensable bills among those rejected bills which are normal but rendered undiscriminatable while being dispensed from the storage boxes to the customer-side bill slot, and for storing the bills from the clerk-side bill slot, and for storing the bills from the clerk-side bill slot into the storage boxes when desired bills stacked in the customer-side bill slot are completely dispensed.

Therefore, re-dispensable bills, such as less skewed bills and successive bills, among those rejected bills which are normal but rendered undiscriminatable while being dispensed from the storage boxes to the clerk-side bill slot are temporarily stacked, in the customer-side bill slot, and the bills are stored from the customer-side bill slot into the storage boxes when desired bills stacked in the clerk-side bill slot are completely dispensed. Re-dispensable bills, such as less skewed bills and successive bills, among those rejected bills which are normal but rendered undiscriminatable while being dispensed from the storage boxes to the customer-side bill slot are temporarily stacked in the clerk-side bill slot, and the bills are stored from the clerk-side bill slot into the storage boxes when desired bills stacked in the customer-side bill slot are completely dispensed.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
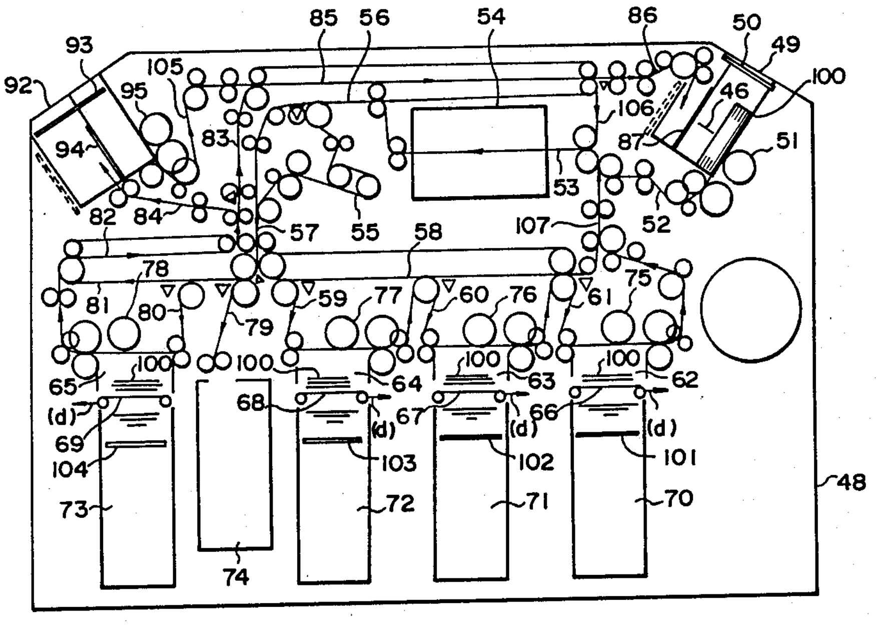
FIG. 1 is a sectional side elevational view of a bill depositing/dispensing apparatus according to the present invention.

A bill depositing/dispensing apparatus, generally denoted at 48, according to the present invention has a customer-side bill slot 49 through which bills can be received and deposited by a customer, a shutter 50 for openable closing the customer-side bill slot 49, a separator 51 for separating and feeding bills deposited through the bill slot 49, feed paths 52, 53, a discriminator 54 for checking bills to ascertain whether they are true or false, normal or marred, their face or back is being detected, and for the bill denomination, a bill reverser 55 for reversing bills the back of which has been detected by the discriminator 54, feed paths 56, 57, 58, 59, 60, 61, temporary storage units 62, 63, 64 for storing normal bills of respective denominations, a temporary storage unit 65 for storing marred bills, the temporary storage units 62, 63, 64, 65 having respective bottom plates 66, 67, 68, 69, storage boxes 70, 71, 72 for storing normal bills of respective denominations, a storage box 73 for storing marred bills, a storage box 74 for storing rejected bills, separators 75, 76, 77 for separating and feeding normal bills, a separator 78 for separating marred bills, and feed paths 79, 80, 81, 82, 83, 84, 85, 86.

Figure 2:
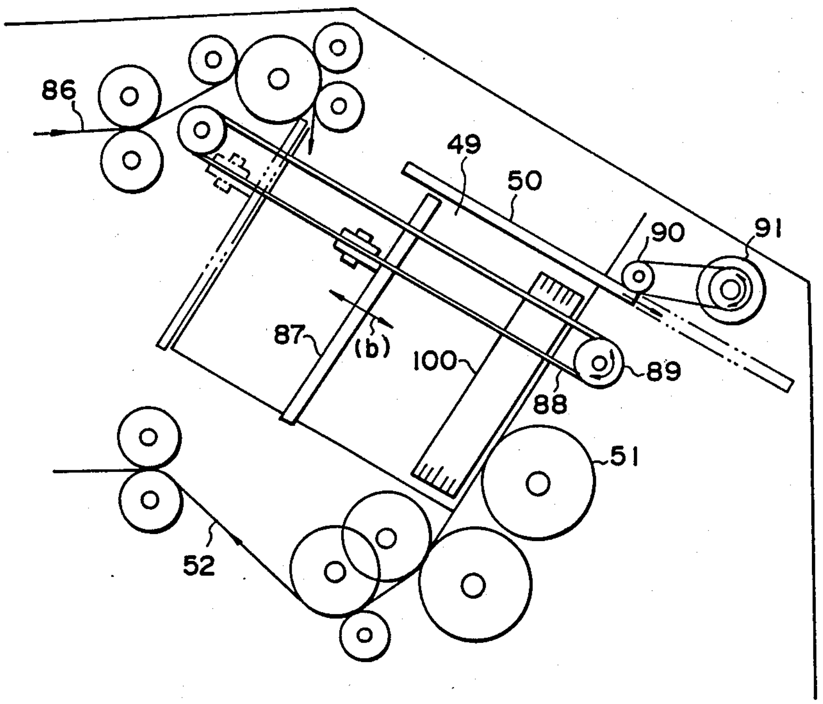
FIG. 2 is an enlarged sectional side elevational view of a portion of the apparatus shown in FIG. 1, which has a customer-side bill slot.

As shown in FIG. 2, a table 87 is disposed in the customer-side bill slot 49 and movable back and forth in the direction of the arrow (b) by means of a driver 89 through a belt 88. The customer-side bill slot 49 is openably closed by the shutter 50 which is movable by a driver 91 through a roller 90.

Apparatus 48 also has a clerk-side bill slot 92 through which bills can be received and deposited by a clerk, a shutter 93 for openably closing the clerk-side bill slot 92, a table 94 disposed in the bill slot 92 and dividing the same into a bill depositing area and a bill dispensing area, and a separator 95 for separating and feeding bills deposited through the bill slot 92.

Figure 3:
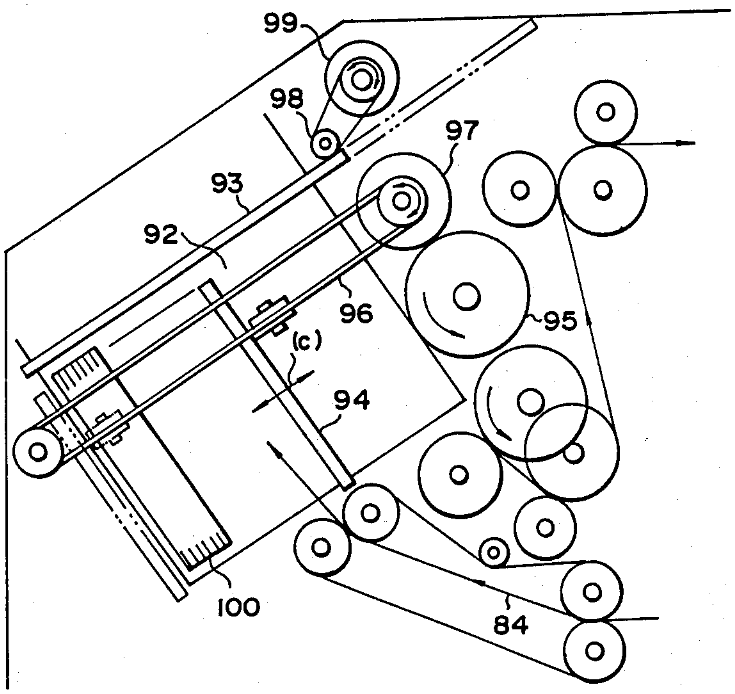
FIG. 3 is an enlarged sectional side elevational view of portion of the apparatus shown in FIG. 1, which has a clerk-side bill slot.
Figure 4:
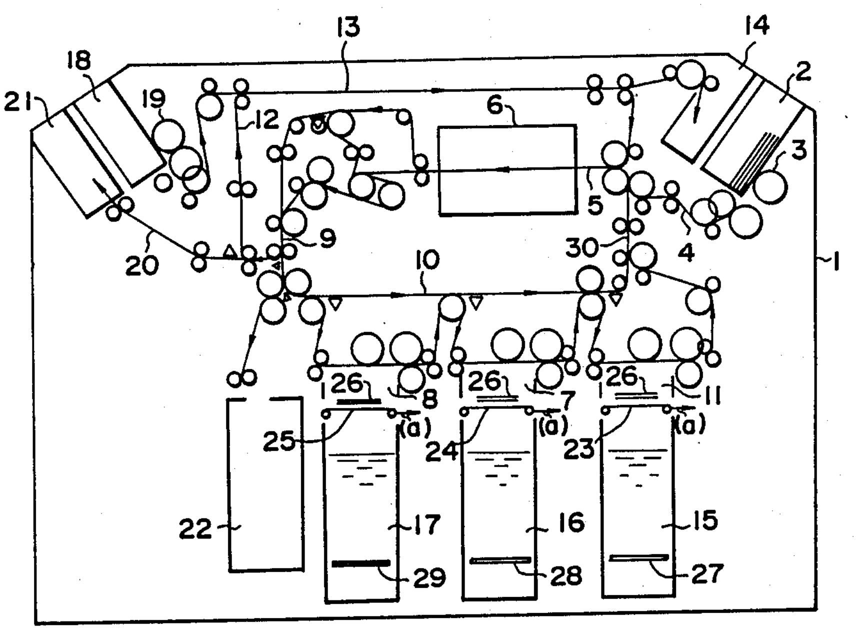
FIG. 4 (PRIOR ART)
FIG. 4 is a sectional side elevational view of a conventional bill depositing/dispensing apparatus.
Figure 5:
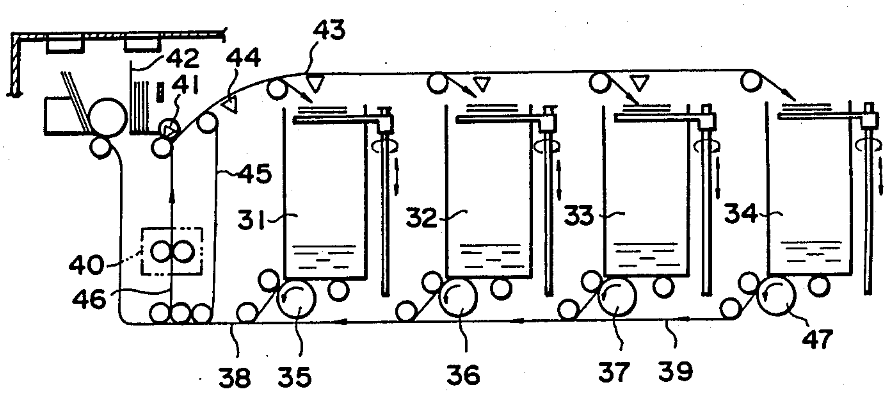
FIG. 5 (PRIOR ART)
FIG. 5 is a sectional side elevational view of another conventional bill depositing/dispensing apparatus.

As shown in FIG. 3, the table 94 disposed in the clerk-side bill slot 92 is movable back and forth in the direction of the arrow (c) by means of a driver 97 through a belt 96. The shutter 93 is movable by a driver 99 through a roller 98.

Operation of the bill depositing/dispensing apparatus will be described with respect to various modes thereof, i.e., DEPOSITING BILLS BY CUSTOMER, DEPOSITING BILLS BY CLERK, DISPENSING BILLS TO CUSTOMER, and DISPENSING BILLS TO CLERK.

DEPOSITING BILLS BY CUSTOMER:

When a command for the transaction about depositing bills by a customer is issued to the apparatus 48 as a result of dealings between the customer and a clerk, the shutter 50 is moved to open the customer-side bill slot 49 to allow the customer to place bills into the bill slot 49. When bills 100 are put into the bill slot 49, they are detected and the shutter 50 is closed, and thereafter the table 87 is displaced to press the bills 100 against the separator 51.

The bills 100 are separated one by one by the separator 51 and fed thereby through the feed paths 52, 53 into the discriminator 54 which checks the bills 100 to ascertain whether they are true or false, normal or marred, their face or back is being detected, and for the bill denomination. Those bills which are true and have their faces detected are delivered through the feed paths 56, 57. Those bills which are true and have their backs detected are delivered through the feed path 56, reversed by the reverser 55, and then through the feed path 57. Those bills 100 which are found normal are delivered through the feed paths 58, 59 into the temporary storage unit 64, through the feed path 60 into the temporary storage unit 63, or through the feed path 61 into the temporary storage unit 62, dependent on the bill denomination. Those bills 100 which are found marred are delivered via the feed paths 56, 57, 81, 80 into the temporary storage unit 65.

When the temporary storage units 62, 63, 64, 65 are full, bills 100 are delivered through the feed paths 56, 57, 81, 82, 84 and discharged into the clerk-side bill slot 92. At this time, the table 94 in the clerk-side bill slot 92 is located in the position indicated by the broken lines and the shutter 93 is closed so that the bills 100 in the bill slot 92 cannot be removed by the clerk.

Those bills 100 which are found false are delivered through the feed paths 56, 57, 81, 82, 83, 85, 86 onto the table 87 in the customer-side bill slot 49. After all bills 100 between the table 87 and the separator 51 have been separated and delivered, the shutter 50 is opened to return the bills 100 in the bill slot 49 to the customer.

If the customer or the clerk accepts the transaction, a signal indicative of the acceptance of the transaction is applied to the apparatus 48. The bottom plates 66, 67, 68, 69 in the temporary storage units 62, 63, 64, 65 are opened in the direction of the arrow (d) to allow the stacked bills 100 to be stored into the storage boxes 70, 71, 72, 73.

Thereafter, stages 101, 102, 103, 104 in the storage boxes are lowered and the bottom plates 66, 67, 68, 69 are moved in the direction opposite to the direction of the arrow (d). When the temporary storage units 62, 63, 64, 65 subsequently become full, the bills 100 stacked in the clerk-side bill slot 92 are pushed up by the table 94, and are separated and delivered by the separator 95. The bills 100 are fed through the feed paths 105, 85, 106 into the discriminator 54 which checks the bills 100 to determine whether they are normal or marred, their face or back is being detected, and for the bill denomination.

The bills 100 are then delivered through the feed path 58 into the temporary storage units 62, 63, 64 where they are stacked. If bills 100 are marred, they are stacked in the temporary storage unit 65. The bills 100 are then stored into the storage boxes 70, 71, 72, 73.

When the transaction or the bill deposit is canceled by the customer or the clerk, a signal representative of the cancel is applied to the apparatus 48 to cause the bills 100 stacked in the temporary storage units 62, 64, 65 to return to the customer-side bill slot 49 in the following sequence:

The bills 100 in the temporary storage unit 62 are pushed up together with the bottom plate 66 by the stage 101, and separated and delivered by the separator 75. The bills 100 are then fed through the feed paths 107, 53, 56, 57, 81, 82, 83, 85, 86 into the customer-side bill slot 49. The bills 100 in the temporary storage unit 63 are pushed up together with the bottom plate 67 by the stage 102, and separated and delivered by the separator 76. The bills 100 are then fed through the feed paths 58, 107, 53, 56, 57, 82, 83, 85, 86 into the customer-side bill slot 49. The bills 100 in the temporary storage unit 64 are pushed up together with the bottom plate 68 by the stage 103, and separated and delivered by the separator 77. The bills 100 are then fed through the feed paths 58, 107, 53, 56, 57, 81, 82, 83, 85, 86 into the customer-side bill slot 49.

The bills 100 temporarily stacked in the clerk-side bill slot 92 because the temporary storage units 62, 63, 64, 65 are full are pushed up by the stage 94 and then separated and delivered by the separator 95. These bills 100 travel through the feed paths 105, 85, 86 and are stacked in the customer-side bill slot 49. Thereafter, the shutter 50 is opened to return the stacked bills 100 that have been placed by the customer.

DEPOSITING BILLS BY CLERK

The shutter 93 is opened and bills 100 are set on the table 94 by a clerk. The table 94 is pushed up and the bills 100 are separated and delivered by the separator 95. Thereafter, the bills 100 are fed thereby through the feed paths 105, 85, 106 into the discriminator 54 which checks the bills 100 to ascertain whether they are true or false, normal or marred, their face or back is being detected, and for the bill denomination. Those bills which are true and have their faces detected are delivered through the feed paths 56, 57. Those bills which are true and have their backs detected are delivered through the feed path 56, reversed by the reverser 55, and then through the feed path 57. Those bills 100 which are found normal are delivered through the feed paths 58, 59 into the temporary storage unit 64, through the feed path 60 into the temporary storage unit 63, or through the feed path 61 into the temporary storage unit 62, dependent on the bill denomination. Those bills 100 which are found marred are delivered via the feed paths 81, 80 into the temporary storage unit 65. When the temporary storage units 62, 63, 64, 65 are full, bills 100 are delivered through the feed paths 81, 82, 84 and discharged into the clerk-side bill slot 92 below the table 94. Those bills 100 which are found false are delivered through the feed paths 81, 82, 84 below the table 94 in the clerk-side bill slot 92.

If the clerk accepts the transaction, a signal indicative of the acceptance of the transaction is applied to the apparatus 48. The bottom plates 66, 67, 68, 69 in the temporary storage units 62, 63, 64, 65 are opened in the direction of the arrow (d) to allow the stacked bills 100 to be stored into the storage boxes 70, 71, 72, 73. Stages 101, 102, 103, 104 in the storage boxes 70, 71, 72, 73 are moved in the direction opposite to the direction of the arrow (d) and closed.

When the transaction or the bill deposit is canceled by the customer or the clerk, a signal representative of the cancel is applied to the apparatus 48 to return the bills 100 stacked in the temporary storage units 62, 64, 65 to the customer-side bill slot 49 in the following manner:

The bills 100 in the temporary storage unit 62 are pushed up together with the bottom plate 66 by the stage 101, and separated and delivered by the separator 75. The bills 100 are then fed through the feed paths 107, 53, 56, 57, 81, 82, 84 into the clerk-side bill slot 92. The bills 100 in the temporary storage unit 63 are pushed up together with the bottom plate 67 by the stage 102, and separated and delivered by the separator 76. The bills 100 are then fed through the feed paths 58, 107, 53, 56, 57, 81, 82, 84 into the clerk-side bill slot 92. The bills 100 in the temporary storage unit 64 are pushed up together with the bottom plate 68 by the stage 103, and separated and delivered by the separator 77. The bills 100 are then fed through the feed paths 58, 107, 53, 56, 57, 81, 82, 84 into the clerk-side bill slot 92. The bills 100 in the temporary storage unit 65 are pushed up together with the bottom plate 69 by the stage 104, and separated and delivered by the separator 78. The bills 100 are then fed through the feed paths 82, 84 into the clerk-side bill slot 92. The inserted bills are all returned to the clerk.

DISPENSING BILLS TO CUSTOMER

The bottom 66, 67, 68 in the temporary storage units are moved in the direction of the arrow (d), and bills 100 are pushed up by the stages 101, 102, 103 and separated and delivered by the separators 75, 76, 77 until the number of bills to be dispensed is reached. The bills 100 are fed through the feed paths 58, 107, 53 into the discriminator 54 which checks the bills 100 for the bill denomination and to ascertain whether their face or back is being detected. Thereafter, the bills 100 are delivered through the feed paths 56, 57, 81, 82, 83, 85, 86 into the customer-side bill slot 49. Among those bills which are found normal but rejected due to some abnormal conditions such as skewed bills, a succession of bills, marred bills, and the like, the bills that are re-dispensable, i.e., less skewed bills and successive bills, are stacked through the feed paths 56, 57, 81, 82, 84 into the clerk-side bill slot 92. At this time, the table 94 is positioned as indicated by the broken lines in FIG. 3, and the shutter 93 is closed so that the bills in the bill slot 92 cannot be removed by the clerk.

When the bills have completely been discharged into the clerk-side bill slot 92, they are delivered via the feed paths 105, 85, 106 into the discriminator 54 which checks them to ascertain whether they are true or false, normal or marred, their face or back is being detected, and for the bill denomination. The bills which are found true and have their faces detected are fed into the feed paths 56, 57, and the bills which are found true and have their backs detected are fed into the feed path 57. Those bills 100 which are found normal are passed through the feed paths 58, 59 and the temporary storage units 62, 63, 64 into the storage boxes 70, 71, 72 dependent on the bill denomination. At this time, the bottom plates 66, 67, 68 remain open.

The bills 100 stacked in the customer-side bill slot 49 are taken out by the customer when the shutter 50 is opened. Those bills which are found undispensable by the discriminator 54 are delivered through the feed paths 56, 57, 79 into the rejected-bill storage box 74.

DISPENSING BILLS TO CLERK

Bills to be dispensed to the clerk are fed through the feed path 56, reversed by the reverser 55, and delivered via the feed paths 57, 81, 82, 84 into the clerk-side bill slot 92. Those bills which are re-dispensable among the rejected bills are temporarily stacked through the feed paths 57, 81, 82, 83, 85, 86 into the customer-side bill slot 49. At this time, the table 87 in the customer-side bill slot 49 is positioned as indicated by the broken lines, and the shutter 50 is closed to prevent the customer from taking out the bills from the customer-side bill slot 49. When the bills have completely been discharged into the customer-side bill slot 49, they are delivered via the feed paths 52, 53 into the discriminator 54 which checks them to ascertain whether they are true or false, normal or marred, their face or back is being detected, and for the bill denomination.

The bills which are found true are fed via the feed paths 58, 59 and the temporary storage units 62, 63, 64 into the storage boxes 70, 71, 72, dependent on the bill denomination. At this time, the bottom plates 66, 67, 68 remain open in the direction of the arrow (d).

The bills 100 stacked in the clerk-side bill slot 92 are taken out by the clerk when the shutter 93 is opened. Those bills which are found undispensable by the discriminator 54 are delivered through the feed paths 56, 57, 79 into the rejected-bill storage box 74.

Although a certain preferred embodiment has been shown and described, it should be understood that many changes and modifications may be made therein without departing from the scope of the appended claim.

What is claimed is:

1. A bill depositing/dispensing apparatus comprising:
(a) a normal-bill storage box for storing normal bills;
(b) a marred-bill storage box for storing marred bills;
(c) a rejected-bill storage box for storing rejected bills;
(d) a separator for separating and feeding normal bills from said normal-bill storage box;
(e) a discriminator for detecting whether or not bills are true or false, normal or marred, and for detecting whether a face or a back of a bill is being presented, and for detecting the denomination of the bill, and for detecting abnormal traveling of the bills;
(f) a customer-side bill slot for receiving and dispensing bills;
(g) a first shutter disposed over said customer-side bill slot;
(h) a drive means for opening and closing said first shutter;
(i) a clerk-side bill slot for receiving and dispensing bills;
(j) a second shutter disposed over said clerk-side bill slot;
(k) a drive means for opening and closing said second shutter;
(l) a first feeding means for feeding bills from said customer-side bill slot to said discriminator, said first feeding means including a first roller for separating bills disposed in said customer-side bill slot from said customer-side bill slot, a first table for pressing bills disposed in said customer-side bill slot against said first roller, and a first drive means for moving said first table back and forth;
(m) a second feeding means for feeding bills from said clerk-side bill slot to said discriminator, said second feeding means including a second roller for separating bills disposed in said clerk-side bill slot from said clerk-side bill slot, a second table for pressing bills disposed in said clerk-side bill slot against said second roller, and a second drive means for moving said second table back and forth;
(n) a third feeding means for feeding normal bills from said discriminator to said normal-bill storage box;
(o) a fourth feeding means for feeding marred bills from said discriminator to said marred-bill storage box;
(p) a fifth feeding means for feeding rejected bills from said discriminator to said rejected-bill storage box;
(g) a sixth feeding means for feeding bills from said discriminator to said customer-side bill slot;
(r) a seventh feeding means for feeding bills from said discriminator to said clerk-side bill slot;
(s) an eighth feeding means for feeding normal bills from said normal-bill storage box to said discriminator; and
(t) a control means for feeding, upon dispensing from said customer-side bill slot, rejected bills which are discriminated as abnormal in traveling by said discriminator from said discriminator to said clerk-side bill slot, and for feeding rejected bills in said clerk-side bill slot to said discriminator.

2. A bill depositing/dispensing apparatus comprising:
(a) a normal-bill storage box for storing normal bills;

(b) a marred-bill storage box for storing marred bills;
(c) a rejected-bill storage for storing rejected bills;
(d) a separator for separating and feeding normal bills from said normal-bill storage box;
(e) a discriminator for detecting whether or not bills are true or false, normal or marred, and for detecting whether a face or a back of a bill is being presented, and for detecting the denomination of the bill, and for detecting abnormal traveling of the bills;
(f) a customer-side bill slot for receiving and dispensing bills;
(g) a first shutter disposed over said customer-side bill slot;
(h) a drive means for opening and closing said first shutter;
(i) a clerk-side bill slot for receiving and dispensing bills;
(j) a second shutter disposed over said clerk-side bill slot;
(k) a drive means for opening and closing said second shutter;
(l) a first feeding means for feeding bills from said customer-side bill slot to said discriminator, said first feeding means including a first roller for separating bills disposed in said customer-side bill slot from said customer-side bill slot, a first table for pressing bills disposed in said customer-side bill slot against said first roller, and a first drive means for moving said first table back and forth;
(m) a second feeding means for feeding bills from said clerk-side bill slot to said discriminator, said second feeding means including a second roller for separating bills disposed in said clerk-side bill slot from said clerk-side bill slot, a second table for pressing bills disposed in said clerk-side bill slot against said second roller, and a second drive means for moving said second table back and forth;
(n) a third feeding means for feeding normal bills from said discriminator to said normal-bill storage box;
(o) a fourth feeding means for feeding marred bills from said discriminator to said marred-bill storage box;
(p) a fifth feeding means for feeding rejected bills from said discriminator to said rejected-bill storage box;
(q) a sixth feeding means for feeding bills from said discriminator to said customer-side bill slot;
(r) a seventh feeding means for feeding bills from said discriminator to said clerk-side bill slot;
(s) an eighth feeding means for feeding normal bills from said normal-bill storage box to said discriminator; and
(t) a control means for feeding, upon dispensing from said clerk-side bill slot, rejected bills which are discriminated as abnormal in traveling by said discriminator from said discriminator to said customer-side bill slot, and for feeding rejected bills in said customer-side bill slot to said discriminator.

* * * * *